United States Patent [19]

Weissenberger

[11] Patent Number: 4,478,323
[45] Date of Patent: Oct. 23, 1984

[54] HYDRODYNAMIC CLUTCH WITH TORSIONAL VIBRATION DAMPING

[75] Inventor: Helmut Weissenberger, Theilheim, Fed. Rep. of Germany

[73] Assignee: Fichtel & Sachs AG

[21] Appl. No.: 345,369

[22] Filed: Feb. 3, 1982

[30] Foreign Application Priority Data

Feb. 7, 1981 [DE] Fed. Rep. of Germany ....... 3104307

[51] Int. Cl.³ .......................... F16H 45/02; F16D 3/14
[52] U.S. Cl. .................................. 192/3.3; 192/70.2; 192/106.2
[58] Field of Search ................. 192/106.2, 70.2, 70.19, 192/70.18, 70.17, 70.16, 3.28, 3.31; 464/66, 68, 81

[56] References Cited

U.S. PATENT DOCUMENTS

| | | | |
|---|---|---|---|
| 3,547,235 | 12/1970 | Weinrich | 192/3.3 |
| 4,101,015 | 7/1978 | Radke | 464/68 |
| 4,266,641 | 5/1981 | Sunohara | 192/106.2 |

FOREIGN PATENT DOCUMENTS

| | | |
|---|---|---|
| 2752357 | 11/1977 | Fed. Rep. of Germany . |
| 1199713 | 7/1970 | United Kingdom . |
| 1530359 | 10/1978 | United Kingdom . |
| 1548113 | 7/1979 | United Kingdom . |
| 2017875 | 10/1979 | United Kingdom . |
| 2027847 | 2/1980 | United Kingdom . |
| 2072304 | 9/1981 | United Kingdom . |
| 1601293 | 10/1981 | United Kingdom . |
| 2076908 | 12/1981 | United Kingdom . |

Primary Examiner—George H. Krizmanich
Assistant Examiner—M. Manley
Attorney, Agent, or Firm—Toren, McGeady and Stanger

[57] ABSTRACT

A hydrodynamic clutch, such as a hydrodynamic torque converter, is rotatable about an axis of rotation and includes a pump wheel impeller, a turbine impeller, and a guide wheel located between the pump wheel impeller and the turbine impeller. A bridging clutch mechanically couples the pump wheel impeller and the turbine impeller. The bridging clutch has a torque transmission part which includes a torsional vibration damping device located between the pump wheel impeller and the turbine impeller. The damping device has at least one circumferentially extending spring located between stops spaced circumferentially about the axis of rotation.

4 Claims, 2 Drawing Figures

HYDRODYNAMIC CLUTCH WITH TORSIONAL VIBRATION DAMPING

SUMMARY OF THE INVENTION

The present invention is directed to a hydrodynamic clutch, such as a hydrodynamic torque converter, and includes a pump wheel impeller, a turbine impeller and where a torque converter is involved, a guide wheel. An actuatable bridging clutch mechanically couples the pump wheel impeller and the turbine impeller.

A torque converter of this general type is disclosed in West German Offenlegungsschrift No. 27 52 357. In this known torque converter, an axially movable annular friction disc is fixed for rotation with the hub of the turbine impeller by a frictionally engaged gear system. A hydraulic piston presses the friction disc against a counter surface on the torque converter housing which rotates with and forms the pump wheel impeller. The hydrodynamic transmission path between the pump wheel impeller and the turbine impeller can be mechanically bridged in this manner free from any slippage.

When such a hydrodynamic clutch is used in motor vehicles, the mechanical bridging clutch transmits torsional vibrations from the internal combustion engine to the driven parts. As a result of the non-uniform load applied to the various elements in the power transmission path, they are exposed to increased wear. In addition, the vibration causes additional noise.

Therefore, it is the primary object of the present invention to provide a hydrodynamic clutch and in particular a hydrodynamic torque converter employing a mechanical bridging clutch between the pump wheel impeller and the turbine impeller so that wear on the various parts in the power transmission path is reduced and there is less noise generated.

In accordance with the present invention, a torsional vibration damping device is located in the torque transmission path of the bridging clutch between the pump wheel impeller and the turbine impeller. Even when the bridging clutch is engaged, the torsional vibration damping device permits a limited angular rotation between the pump wheel impeller and the turbine impeller so that the thrust-like rotary loads on one of these impellers can be transmitted to the other in a reduced state.

In a preferred embodiment, the bridging clutch has a clutch disc with a hub part secured with the turbine impeller so the two parts rotate as a unit. The bridging clutch also includes a friction disc part including the torsional vibration damping device secured so that it rotates with the hub part. The friction disc part can be placed in frictional contact with a counter surface secured for rotation with the pump wheel by means of an actuating device, such as a hydraulic piston. In this embodiment, the damping device limits the torsional vibration in the power transmission parts of the bridging clutch which are exposed to shock or sudden loads.

In accordance with the present invention, a simple construction and space-spacing arrangement of the torsional vibration damping device is provided by a friction disc part secured on a hub part with stops arranged in cooperating pairs on both the friction disc part and the hub part. The cooperating stops are spaced apart in the circumferential direction around the axis of rotation of the hydrodynamic clutch. A spring is located between the cooperating stops in the friction disc part and the hub part and when relative rotational motion occurs between the two in the circumferential direction, the spring is stressed. The torsional vibration damping device may include a number of such spring-stop units provided in the friction disc part and the hub part and spaced apart in the circumferential direction of the bridging clutch.

In the bridging clutch, each spring is seated within a window in an annular flange of the friction disc part and the opposite ends of the window, spaced apart in the circumferential direction, form the stops on the friction disc. The hub part includes a pair of guide discs with the annular flange positioned between them so that they rotate together. At least one of the guide discs is provided with stops for the ends of the spring which projects laterally outwardly from the window in the annular flange. The two guide discs fix the annular flange in the axial direction of the clutch and, at the same time, fasten the spring within the windows through which it projects.

Accurate guidance of the annular flange in the radial direction is provided by a radially inwardly facing shoulder surface on the annular flange which is guided on a radially outwardly facing annular surface on one of the guide discs. Preferably, the guide discs are shaped sheet-metal parts. It is preferred to form the guidance surface by providing a flange on the radially outer edge of one of the guide discs so that the flange faces away from the turbine impeller and also away from the annular flange but in juxtaposition to the radially inwardly facing surface on the annular flange.

The torsional vibration damping device can be constructed as a frictional vibration damping device at low cost and in a space-saving arrangement, if the guide discs forming the hub part are prestressed resiliently toward one another in the region of the annular flange and are in frictional contact with the annular flange. With this arrangement the guide discs clamp the annular flange between them by frictional engagement.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
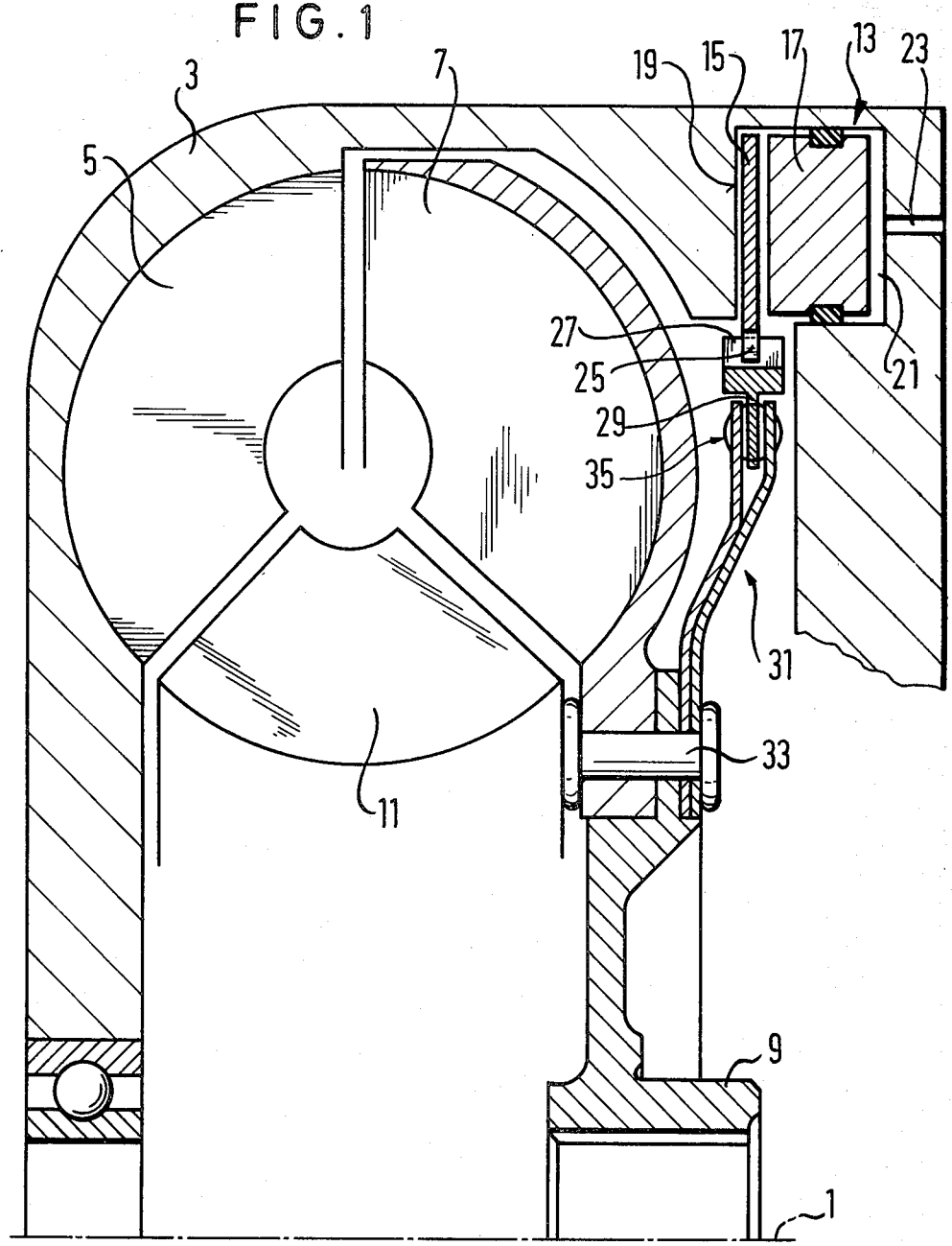
FIG. 1 is a partial schematic axial section of a hydrodynamic torque converter with a hydraulically actuated bridging clutch including a torsional vibration damping device.

In FIG. 1 a portion of a hydrodynamic torque converter is illustrated including a housing 3 arranged to rotate about an axis 1 with the housing having a plurality of blades of a pump wheel impeller 5 or forming in one part the pump wheel impeller. The housing 3 is connected for rotation with the crankshaft, not shown, of an internal combustion engine. A turbine impeller 7 is positioned within and is rotatable relative to the housing 3 and the turbine impeller has a hub 9 connected for rotation with a driven shaft, not shown. Located axially between the pump wheel impeller 5 and the turbine impeller 7 is a guide wheel 11 which can be secured at least in one rotational direction for controlling the flow conditions of the fluid used in the hydrodynamic torque converter. The operation of such a torque converter is well known, and, accordingly, is not described in any detail.

Pump wheel impeller 5 can be mechanically coupled with the turbine impeller 7 by an actuatable friction or bridging clutch 13 to prevent slippage between the two wheels or impellers. A friction disc 15 shaped as an annular disc forms a part of the bridging clutch 13 and is located on the side of the turbine impeller 7 which faces away from the pump wheel impeller 5. Friction disc 15 can be pressed or displaced by an annular hydraulic piston 17 against a counter surface 19 formed on the housing 3. Annular piston 17 is positioned in an annular pressure chamber 21 which receives a hydraulic fluid through a feed pipe 23.

At its radially inner circumferential periphery, the friction disc 15 has an interior gearing 25 which meshes with an exterior gearing 27 on a hub-shaped annular flange 29. While the two gearings 25 and 27 are in meshed engagement the gearing 25 is axially movable relative to the gearing 27. Annular flange 29 is held in a hub part 31 so that it is displaceable relative to the hub part over a limited angle of rotation, however, it is secured against displacement in the axial direction. Hub part 31 is fixed by rivets 33 to the hub 9 of the turbine impeller 7. A torsional vibration damping device 35 is located in the region where the annular flange 29 is in engagement with the hub part 31. The damping device 35 is stressed when there is relative rotation between the annular flange 29 and the hub part 31. This torsional vibration damping device reduces rotational vibration shock between the housing 3 or pump wheel impeller 5 and the hub 9 of the turbine impeller 7. Since the torsional vibration damping device 35 is located in the part of the bridging clutch which transmits torque between the friction disc 15 and the hub 9, the gearings 25, 27 which would be highly stressed under shock loads or sudden loads are relieved from such stressing action.

Figure 2:
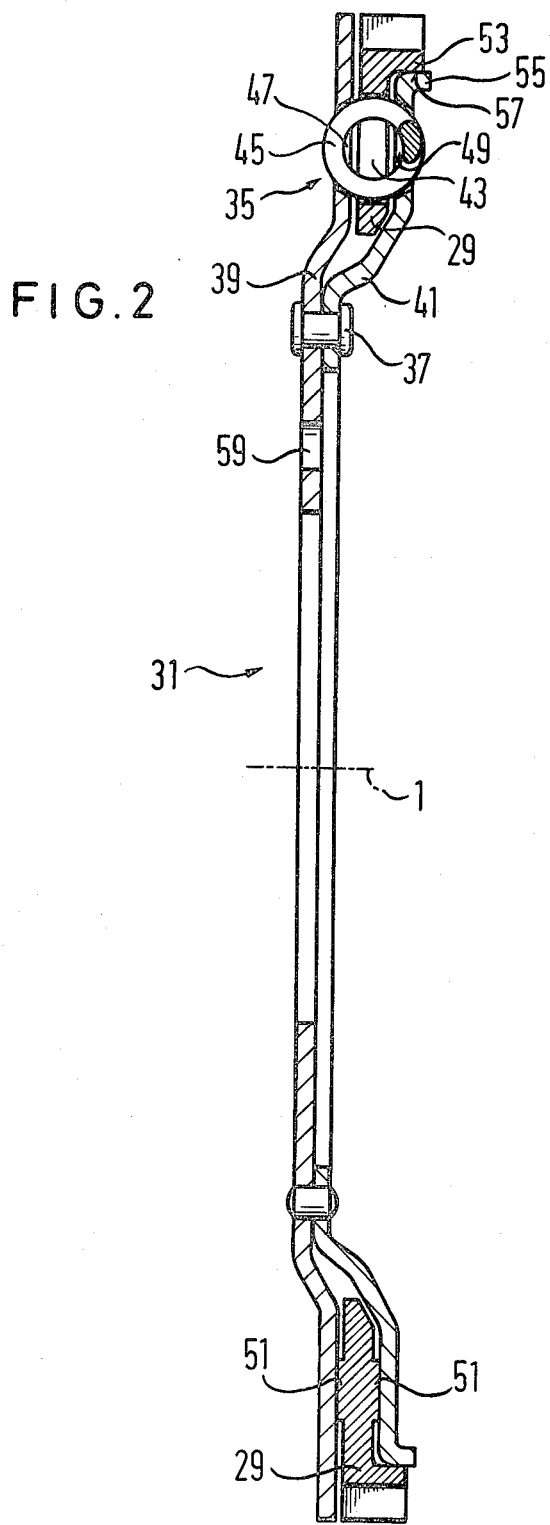
FIG. 2 is an axial section through another torsional vibration damping device which can be used in the torque converter illustrated in FIG. 1.

In FIG. 2 details of a torsional vibration damping device 35 which can be employed in the torque converter of FIG. 1, are shown. Hub part 31 is made up of two annular guide discs 39, 41 constructed as sheet metal molded parts and fastened together by rivets 37. At the location where the rivets 37 secure the guide discs 39, 41 together the guide discs are in surface contact, however, radially outwardly from this location the guide discs are spaced apart in the axial direction of the axis 1 and the radially inner part of the annular flange 29 is located between them. Windows 43 are formed in the annular flange 29 with the windows extending and spaced apart in the circumferential direction of the flange. A helical compression spring 45 is positioned in each of the windows 43 with the compression spring extending in the circumferential direction and also extending laterally outwardly from the opposite sides of the annular flange. The compression springs 45 can be stressed under pressure. The opposite ends of the helical compression springs 45 bear against the opposite ends of the windows 43 spaced apart in the circumferential direction, that is, the ends of the windows which extend radially relative to the axis 1. As can be seen in FIG. 2 the springs project laterally outwardly in the axial direction of the axis 1 from the opposite sides of the annular flange 29. Similarly, guide discs 39, 41 have windows 47, 49 on the opposite sides of the windows 43 so that the axially projecting portions of the compression springs 45 extend axially into these windows in the guide discs. The radially extending ends of the windows 47, 49 also form support surfaces for the ends of the compression spring 45. Moreover, the windows 47, 49 are formed so that the helical compression springs 45 are held securely in the windows 47. When the annular flange 29 rotates relative to the hub part 31, the helical compression springs 45 are compressed between the radially extending end surface of the window 43 at one end and against the radially extending ends of the windows 47, 49 at the other end. In this way, the helical compression springs 45 absorb rotational vibration. In effect, the radially extending ends of the windows act as stops for the compression springs with the springs being compressed between these stops during relative rotational movement between the annular flange 29 and the guide discs 39, 41 of the hub part 31.

The windows 43, 47 and 49 are spaced apart in the circumferential direction and on the surfaces of the annular flange 29 between adjacent helical compression springs 45, annular projections are provided extending axially from both of the opposite surfaces of the flange. As can be seen in the lower portion of FIG. 2, the projections 51 abut in planar contact with the juxtaposed surfaces of the guide discs 39, 41. Annular projections 51 are made of a frictional material or are coated with a frictional material. Guide discs 39, 41 are formed so that they are resiliently prestressed toward one another and clamp the annular flange between them thereby forming a frictional vibration damping device.

Annular flange 29 has a radially outer axially extending part facing away from the turbine impeller 7 and forming an inwardly facing annular shoulder 53. An annular flange 55 is similarly formed on the radially outer edge of the guide disc 41 and extends axially away from the turbine impeller. Flange 55 forms an outwardly facing guide surface 57 complementary to the shoulder 53 and provides guidance for the annular flange 29 about a relatively large diameter.

In FIG. 2, guide discs 39, 41 are connected together by rivets 37 and separate rivets, not shown, can be provided through holes 59 in the guide disc 39 for fastening the hub part 31 onto the hub 9. Rivets 37 would be superfluous if, as illustrated in FIG. 1, rivets 33 fasten both of the guide discs 39, 41 to the hub 9.

The frictional annular projections 51 on the annular flange 29 extend in the circumferential direction between the radially extending ends of the windows 43. It would be possible, however, to provide shorter frictional surfaces extending in the circumferential direction.

While specific embodiments of the invention have been shown and described in detail to illustrate the application of the inventive principles, it will be understood that the invention may be embodied otherwise without departing from such principles.

I claim:

1. A hydrodynamic clutch, such as a hydrodynamic torque converter, including a pump wheel impeller and a turbine impellar rotatable about a common axis and clutch means for mechanically coupling said pump wheel impeller and said turbine impeller, said clutch means comprising:

a clutch-engaging countersurface and a clutch actuating device on said pump wheel impeller;

an annular friction disc on said turbine impeller;

said clutch actuating device operating to bring said friction disc and said countersurface into frictional contact with each other to engage said clutch means;

a pair of guide discs rotatively affixed with each other and with said turbine impeller;

an axially extending flange on one of said guide discs defining a radially outwardly directed guide surface;

an annular flange member engaged between said pair of guide discs arranged to be rotatable relative thereto, said annular flange having a radially inwardly directed annular shoulder which is located radially outwardly of and which is radially guided on said radially outwardly directed guide surface defined by said axially extending flange;

gear means comprising interengaging gear teeth formed on said annular flange member and said annular friction disc to effect torque transmission therebetween whereby torque transmission between said turbine impeller and said pump wheel impeller may be effected when said clutch means is engaged; said friction disc being supported through said gear means on said annular flange member so as to be rotatively fixed by axially displaceable relative thereto; and spring means engaged between said annular flange member and said guide discs for damping torsional vibrations upon application thereto of forces generated as a result of relative rotative movement between said annular flange member and said guide discs;

said annular flange member and said guide discs being formed with circumferentially aligned windows through which said spring means extend and in which said spring means are held in torque transmitting engagement therebetween to effect said torsional vibration damping.

2. A clutch according to claim 1 wherein said friction disc has an inner circumferential portion and wherein said annular flange has an outer circumferential portion, said gear means comprising inner toothing on said inner circumferential portion of said friction disc and outer toothing on said outer circumferential portion of said annular flange, said inner toothing and said outer toothing being in engagement with each other to rotatively couple said friction disc and said annular flange while enabling axial displacement therebetween.

3. A clutch according to claim 1 wherein said pair of guide discs are constructed as axially resilient sheet metal members which clamp said annular flange in frictional contact therebetween.

4. A clutch according to claim 3 wherein said annular flange is formed with at least one raised portion extending on one side thereof axially in the direction of said common axis laterally of said spring means forming a friction surface, said raised portion lying substantially on a common radius with said spring means.

* * * * *